Feb. 12, 1952 — L. MYERS — 2,585,822
RECEPTACLE HOLDER FOR ELECTRIC DRINK MIXERS
Filed May 9, 1949
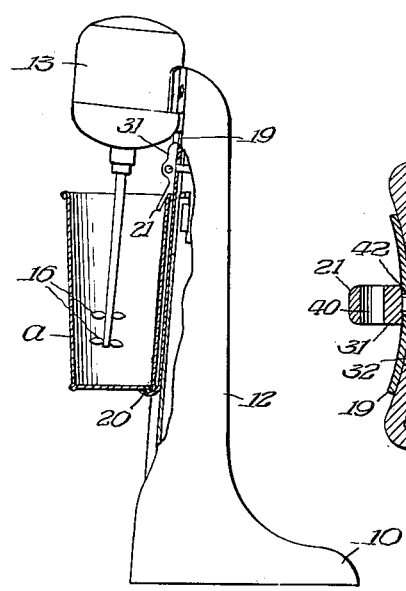
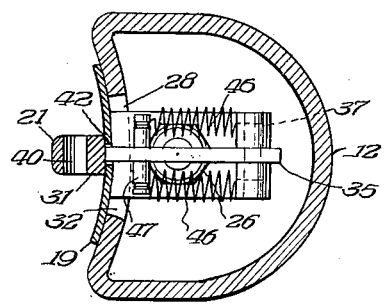
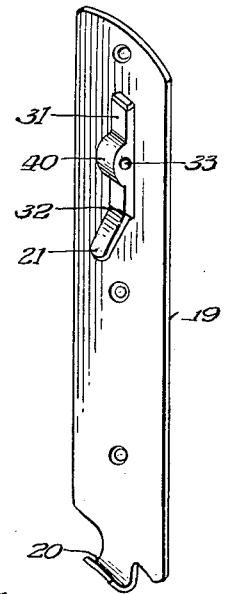
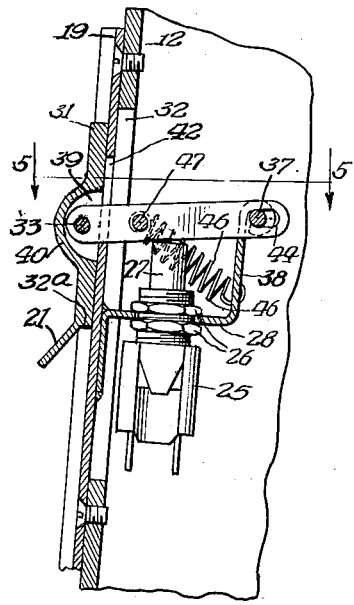
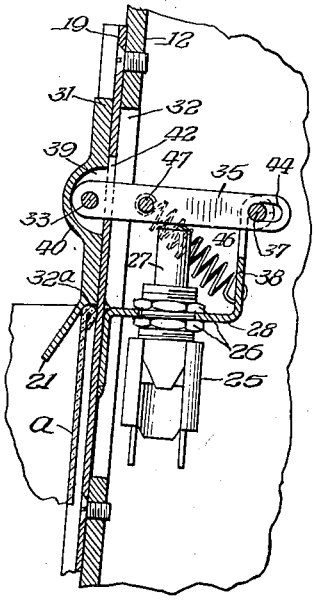
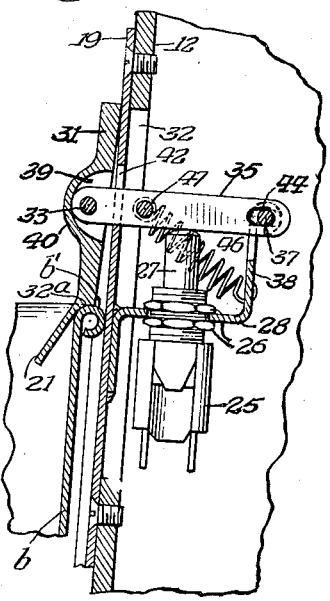
Inventor
Louis Myers
By Fred Gerlach
his Atty.

Patented Feb. 12, 1952

2,585,822

UNITED STATES PATENT OFFICE 2,585,822

RECEPTACLE HOLDER FOR ELECTRIC DRINK MIXERS

Louis Myers, Rockford, Ill.

Application May 9, 1949, Serial No. 92,113

6 Claims. (Cl. 259—108)

The invention relates to electric drink mixers and more particularly to the type in which the placement of the container in a holder which supports it in operative position around a motor-driven depending agitator, automatically controls the starting and the stopping of the motor.

It is now general practice to place the ingredients to be mixed in a metal or glass container which is manually placed in a holder of the electric drink mixer for supporting the container in its operative position around the agitator and to utilize the holder for automatically controlling the electric-motor to start when the container is manually placed in the holder, and to stop when the container is manually removed. It is also common practice to pour the mixed beverage from the metal or glass container into a paper cup or a drinking glass which is served to the consumer. Heretofore, so far as I am aware, it has been found to be objectionable to mix the ingredients in paper cups in which the beverages are served to the consumer because the holder for gripping and supporting a paper cup and controlling the electric-switch for the motor circuit produced deformations or marred the rim when the cup is formed of flexible material such as paper.

One object of the invention is to provide an electrical drink mixer with a holding device which controls the switch for starting and stopping the motor and usually includes a hook for the upper rim of the container which is adapted to retain, and to be shifted by, the paper cup without marring or deforming its rim, so that the drink may be served to the consumer in the cup in which it has been mixed.

Another object of the invention is to provide an electric drink mixer of this type with a holder for the container which controls the starting and stopping of the motor, and is adapted for use with a container formed of light flexible material such as paper, and also with a container formed of rigid material such as metal.

Other objects of the invention will appear from the detailed description.

The invention consists in the several novel features which are hereinafter set forth, and are more particularly defined by claims at the conclusion hereof.

In the drawings:

Figure 1 is a side elevation of a drink mixer embodying the invention, parts being broken away and shown in section for illustrative purposes.

Figure 2 is a vertical section of the switching and holding device in its normal position, Figure 3 is a section illustrating the holder for the upper rim of the container and the switch controlled thereby when a paper container is used.

Figure 4 is a similar view illustrating the operation when a metal container with a rolled rim is used in the mixer.

Figure 5 is a section taken on line 5—5 of Figure 2.

Figure 6 is a perspective of the guide plate for the container and the holder movably mounted thereon.

The invention is exemplified in an electric drink mixer which comprises a base 10 with a hollow standard 12 and an electric motor at the upper end of and in front of the standard. The motor is provided with a depending shaft 15, to the lower end of which agitators 16 are secured. A plate 19 arcuate in cross-section for guiding a container to and from its operative position around the agitator is secured by screws to the front face of standard 12. A hook 20 integral with plate 19 functions as a bottom support or rest for the lower rim of the container. A holder 31 includes a hook 21 and is adapted to be shifted by the upper rim of the container, and removably supports the container on the bottom support during a mixing operation. In the use of the mixer, the operator manually manipulates the container with its upper rim guided by the plate 19 between the hook 21 and the arcuate front face of plate 19, then lifts the container and holder 31 sufficiently to manipulate the container angularly for engaging the rim of the container with the bottom hook 20 on plate 19. The container will then be supported in its operative position around the agitator-shaft for a mixing operation.

The holder 31 also controls the starting and stopping of the motor 13 by means of a switch 25 which is included in an electric circuit connected to a supply line and to the motor. Said switch is adjustably mounted by nuts 26 in a bracket 28 and includes a push button 27 which is normally spring-pressed upwardly to urge the switch to its closed position for the operation of the motor, and when depressed will open the circuit and stop the motor.

Switch 25 is mounted in the bracket 28 which is fixedly secured by welding or soldering to the backface of plate 19. The holder 31 is mounted at the front of plate 19 and the bracket 28 in which switch 25 is mounted and the means controlled by said holder for shifting switch 25 are mounted on the back of guide plate 19 to permit unitary separation from the standard 12 of the plate 19 and the parts mounted thereon, when access to the switch and said means is desired. The front face of standard 12 is provided with an opening 32 through which bracket 28 and the parts mounted thereon can be inserted into and removed from the standard.

The inner face of holder 31 is cylindrically convex conformably to the arcuate cross-section of the front face of guide plate 19, so that the holder may slide rectilinearly on the front face of the plate when the holder is shifted by the container. Hook 21 is integrally formed with the holder and is inclined forwardly and downwardly from a flat shoulder 32a. Holder 31 is urged towards the front face of plate 19 by spring means hereinafter described, and is also supported so its upper end can fulcrum on the front face of plate 19, when the hook 21 is forced away from the front face of plate 19 by a container having an upper rim of sufficient thickness to cause such pivotal movement. A lever 35 has its front end extending into a socket 39 in the rear face of holder 31 and is pivotally connected by a pin 33 to said holder. The front of socket 39 is closed by a protuberance 40 on holder 31. The inner end of lever 35 is slidably fulcrumed on a pin 37 which is fixedly supported in an upstanding member 38 of bracket 28. Fulcrum-pin 37 extends through a slot 44 in the inner end of lever 35 to permit pivotal and sliding movement of the inner end of said lever. The front end of lever 35 extends through a slot 42 in guide-plate 19 and the lower end of said slot functions as a stop for arresting lever 35 in its normal position as illustrated in Fig. 2. In normal position lever 35 holds push-button 27 depressed to cause switch 25 to open the circuit for motor 13 and when the lever is swung upwardly releases said button to open said switch.

A pair of tension springs 46 extend between the upstanding member 38 of bracket 28 and a pin 47 fixed in lever 35 at such an angle that they will exert an inward pull on lever 35 and pivot-pin 33 which will cause the under face of holder 31 to contact the front face of plate 19 and permit rectilinear sliding movement of the holder on said plate. The springs 46 also exert a downward pull through pin 33 and lever 35 on the holder 31, which will cause lever 35 to engage the lower end of slot 42 and position the holder in its normal position. The downward pull of springs 46 and the slidability of the inner end of lever 35 on fulcrum pin 37 present the holder 31, when shifted by the upper rim of a container, to slide rectilinearly on plate 19 without causing any backward pressure of hook 21 against the upper rim of a container when its upper rim is too thin to produce any substantial outward movement on hook 21. This occurs when a paper cup a is used for a mixing container, the rim of which is comparatively thin and provided with an integral bead-forming fold which can be easily crushed or marred by transverse pressure. In such a cup the vertical stability of its side-wall is sufficient to shift the holder rectilinearly because of the slight downward pull of springs 46 applied to the holder through lever 35 and pin 33. When the upper rim of a container of rigid material having sufficient thickness to force the hook 21 outwardly is being manipulated into its operative position, the slot 44 in lever 35 and springs 46 permit the holder 31 to fulcrum at its upper end on the front face of plate 19. This occurs when a metal container b with its usually relatively large rolled upper rim or a container of thick glass is used, which are sufficiently rigid to produce such pivotal movement of the holder.

The operation is as follows: Normally the holder 31 and lever 35 are positioned as illustrated in Fig. 2. Springs 46 exert an inward pull of a predetermined degree to lightly press holder 31 toward the front face of plate 19 and the contiguous faces of the holder 31 and plate 19 will be in parallel relation. Springs 46 will also exert a sufficient predetermined degree of downward pull on the holder to cause lever 35 to abut against the lower end of slot 42, and to hold push-botton 27 depressed to open the circuit for the motor. A container formed of thin flexible material such as paper is usually provided with a head at its upper end which can be easily crushed or deformed by transverse pressure, while the side-wall and rim of the cup present a degree of vertical stiffness. When such a paper cup is used for mixing, its upper rim will be guided by plate 19 to the back of the hook 21 and moved upwardly a sufficient distance so that the bottom rib of the cup will overlie bottom hook 20, and the cup is then lowered so its bottom rim will be seated on hook bottom support 20. The shoulder 32a on holder 31 at the back of hook 21 will then be lightly seated on the upper rim of the paper cup and the latter will be supported in its operative position around the agitator. The upper rim of the cup will be confined between the front face of plate 19 and the inner face of hook 21, and substantially no transverse pressure will be exerted by hook 21 on said rim as illustrated in Fig. 3. As a result, the rim of the paper cup will not be crushed or marred by transverse pressure. During the placement of the paper cup into and out of its operative position around the agitator, the holder 31 will move rectilinearly on the front face of plate 19 and the cup will be subjected to sufficient relatively light vertical pressure to hold the cup in its operative position during the mixing operation. This rectilinear movement results because the slot 44 permits movement of lever 35 on the fulcrum pin 37, and the inward pull of springs 46 is exerted on the pin 33 which pivotally connects lever 35 and holder 31. While the container a remains in operative position around the agitators, lever 35 releases the push-button 27 for the operation of the motor until the container is removed and the holder is retracted to its normal position.

Containers b formed of metal and usually provided with a relatively large rolled rim b' are also used for mixing beverages. These containers are sufficiently rigid so that they will not be crushed or marred by the holder for the upper rim. It is also desirable to adapt the mixer for tightly gripping the rims of such containers. In use of container b, its upper rim b' is guided by plate 19 to the back of hook 21, and the container is lifted so the bottom of the container may be manipulated over and lowered onto the bottom hook 20, and so that the holder 31 will be raised from its normal position as illustrated in Fig. 4. During the upward movement of holder 31 by the container the rolled rim b' will engage the angular hook 21 and wedge the lower end of the holder away from the front face of plate 19 while its upper end fulcrums on said face, and said rim will engage shoulder 32a and lift the holder. Springs 46 exert both a downward and an inward pull on lever 35, which through pin 33, will cause the holder 31 to exert a downward pressure on the rim b' to hold the container on the bottom hook 20, and also an inward pressure to force said rim against the front face of plate 19. The metal container will then be securely supported in its operative position around the agitators. The upward swinging movement of lever 35 by the movement of the holder 31 will release push-button 27 for starting the motor 13. When the container b is to be removed, it will be lifted so its bottom rim will clear bottom support 20, and then manipulated to clear the agitators, and springs 46 will retract holder 31 and lever 35 to their normal position as illustrated in Fig. 2, in which lever 35 will depress switch button 27 to automatically stop the motor 13. This operation of the holder is adapted to firmly secure a relatively heavy container formed of rigid material in its operative position during the mixing operation.

The invention exemplifies a drink mixer of the type in which the operation of the electric-motor is controlled by the placement of the container into and out of its operative position by manual manipulation of the container, and which is adapted for mixing beverages either in containers of thin flexible material such as paper, which can be crushed or deformed by the holder, and also for heavier rigid containers formed of metal, where both or either types of containers are in use.

The invention is not to be understood as restricted to the details set forth since these may be modified within the scope of the appended claims without departing from the spirit and scope of the invention.

Having thus described my invention, what I claim as new and desire to secure by Letters Patent is:

1. The combination with an electric drink mixer comprising a support and an electric-motor with a depending shaft provided with an agitator and carried by said support, of means for supporting a manually manipulated container in its operative position around the agitator, comprising: a guide-plate for the container on the support provided with an outer face, a bottom support for the container, a holder for receiving the upper rim of the container having an inner face slidable on the outer face of the plate and provided with a hook at its lower end, a lever having itse outer end pivotally connected to the holder, a means supported on the plate provided with a fulcrum on which the inner end of the lever is slidable, and spring-means between the lever and the supporting means for the fulcrum for exerting an inward pull and a downward pull on the lever and its pivotal connection to the holder for engaging the contiguous faces of the holder and plate and retracting the holder to its normal position, the fulcrum for the inner end of the lever and pivotal connection between lever and the holder rendering the holder rectilinearly slidable on the front of the plate when a container with a deformable upper rim is placed in said operative position, the upper end of the holder being seated for pivotal movement of the holder on the front face of the plate by a rigid container with a relatively thick upper rim shifted into said operative position.

2. The combination with an electric drink mixer comprising a support and an electric-motor with a depending shaft provided with an agitator and carried by said support, of means for supporting a manually manipulated container in its operative position around the agitator, comprising: a guide-plate for the container on the support provided with an arcuate outer face, a bottom support for the container, a holder for receiving the upper rim of the container having an inner arcuate face slidable on the arcuate face of the plate and provided with a hook at its lower end, a lever having its outer end pivotally connected to the holder, a means supported on the plate provided with a fulcrum on which the inner end of the lever is slidable, and spring means between the lever and the supporting means for the fulcrum for exerting an inward pull and a downward pull on the lever and its pivotal connection to the holder for engaging the contiguous faces of the holder and the plate and retracting the holder to its normal position, the fulcrum for the inner end of the lever and pivotal connection between the lever and the holder rendering the holder rectilinearly slidable on the front of the plate when a container with a deformable upper rim is placed in said operative position, the upper end of the holder being seated for pivotal movement of the holder on the front face of the plate by a rigid container with a relatively thick upper rim shifted into said operative position.

3. The combination with an electric drink mixer comprising a support and an electric-motor with a depending shaft provided with an agitator and carried by said support, of means for supporting a manually manipulated container in its operative position around the agitator, comprising: a guide-plate for the container on the support provided with an outer face, a bottom support for the container, a holder for receiving the upper rim of the container having an inner face slidable on the outer face of the plate and provided with a flat shoulder and a hook at its lower end, a lever having its outer end pivotally connected to the holder, a means supported on the plate provided with a fulcrum on which the inner end of the lever is slidable, and spring-means between the lever and the supporting means for the fulcrum for exerting an inward pull on the lever and its pivotal connection to the holder for engaging the contiguous faces of the holder and the plate and retracting the holder to its normal position by a downward pull on the lever and said pivotal connection, the fulcrum for the inner end of the lever and pivotal connection between the lever and the holder rendering the holder rectilinearly slidable on the front of the plate when a container with a deformable upper rim engages said shoulder and is placed in said operative position, the upper end of the holder being seated for pivotal movement of the holder on the front face of the plate by a rigid container with a relatively thick upper rim shifted into said operative position.

4. The combination with an electric drink mixer comprising a support and an electric-motor with a depending shaft provided with agitators and carried by said support, of means for supporting a manually manipulated container in its operative position around the agitator, comprising: a guide-plate for the container on the support provided with an arcuate outer face, a bottom support for the container on said plate, a holder for receiving the upper rim of the container having an inner face slidable on the arcuate face of the plate and provided with a hook at its lower end, a bracket fixed to the inner side of the plate, a lever having its outer end pivotally connected to the holder, a fulcrum between the bracket and the lever on which the inner end of the lever is slidable, and spring-means between the lever and the bracket for exerting an inward pull and a downward pull on the lever and its pivotal connection to the holder, and for engaging the contiguous faces of the holder and the plate and retracting the lever and the holder to its normal position, the fulcrum for the inner end of the lever and pivotal connection between the lever and the holder rendering the holder rectilinearly slidable on the front of the plate when a container with a deformable upper rim is placed in said operative position, the upper end of the holder being seated for pivotal movement of the holder on the front face of the plate by a rigid container with a relatively thick upper rim shifted into said operative position.

5. The combination with an electric drink mixer comprising a support and an electric-motor with a depending shaft provided with agitators and carried by said support, of means for supporting a manually manipulated container in its operative position around the agitator and controlling the operation of the motor by the placement of the container into and its removal from said operative position, comprising: a plate for the container on the front of the support provided with an outer guide-face, a bottom support on the plate for the container, a holder for receiving the upper rim of the container having an inner face slidable on the outer face of the plate and provided with a hook at its lower end, a bracket on the inner side of the plate, a lever having its outer end pivotally connected to the holder, a fulcrum on which the inner end of the lever is slidable, spring-means between the bracket and the lever exerting an inward pull on the lever for engaging the contiguous faces of the holder and the plate and a downward pull for retracting the holder to its normal position, the fulcrum for the inner end of the lever rendering the holder rectilinearly slidable on the front face of the plate when a container with a deformable upper rim is placed in said operative position, the upper end of the holder being seated for pivotal movement of the holder on the front face of the plate by a container with a relatively thick upper rim shifted into its operative position, and an electric switch connected to control the motor and shiftable by the lever to start and stop the motor.

6. The combination with an electric drink mixer comprising a support and an electric-motor with a depending shaft provided with an agitator and carried by said support, of means for supporting a manually manipulated container in its operative position around the agitator, and controlling the operation of the motor by the placement of the container into and its removal from said operative position, comprising: a plate for the container on the front of the support provided with an outer guide-face, a bottom support on the plate for the container, a holder for receiving the upper rim of the container having an inner face slidable on the outer face of the plate and provided with a hook at its lower end, a bracket on the inner side of the plate, a lever having its outer end pivotally connected to the holder, a fulcrum between the bracket and the lever on which the inner end of the lever is slidable, spring means between the bracket and the lever exerting an inward pull and downward pull on the lever for engaging the contiguous faces of the holder and the plate and for retracting the holder to its normal position, the fulcrum for the lever rendering the holder rectilinearly slidable on the front face of the plate when a container with a deformable upper rim is placed in said operative position, the upper end of the holder being seated for pivotal movement of the holder on the front face of the plate by a container with a relatively thick upper rim shifted into its operative position, and an electric switch connected to control the motor and shiftable by the lever to start and stop the motor.

LOUIS MYERS.

REFERENCES CITED

The following references are of record in the file of this patent:

UNITED STATES PATENTS

| Number | Name | Date |
|---|---|---|
| 1,711,396 | Ruetz | Apr. 30, 1929 |
| 2,294,489 | Terry | Sept. 1, 1942 |
| 2,345,479 | Johnson | Mar. 28, 1944 |